US007126930B2

(12) United States Patent
Pankaj et al.

(10) Patent No.: US 7,126,930 B2
(45) Date of Patent: Oct. 24, 2006

(54) METHOD AND APPARATUS FOR TRANSMITTING MESSAGES IN A WIRELESS COMMUNICATION SYSTEM

(75) Inventors: Rajesh Pankaj, San Diego, CA (US);
Stein Lundby, Solana Beach, CA (US);
Byron Yafuso, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 811 days.

(21) Appl. No.: 09/781,012

(22) Filed: Feb. 10, 2001

(65) Prior Publication Data

US 2002/0155835 A1    Oct. 24, 2002

(51) Int. Cl.
*H04B 7/216* (2006.01)

(52) U.S. Cl. .................. 370/335; 370/342; 370/441

(58) Field of Classification Search ............ 370/310, 370/321, 329, 330, 336, 337, 345, 347, 350, 370/311, 474, 426, 428, 498, 503, 509, 514, 370/512, 523, 342, 406, 478, 320; 455/522, 455/127, 127.01–127.06; 382/247; 375/141, 375/130, 142

See application file for complete search history.

(56) References Cited

U.S. PATENT DOCUMENTS

| | | | | |
|---|---|---|---|---|
| 4,483,012 A | * | 11/1984 | Wei ............................ | 375/244 |
| 5,056,109 A | | 10/1991 | Gilhousen et al. | |
| 5,265,119 A | | 11/1993 | Gilhousen et al. | |
| 5,289,501 A | * | 2/1994 | Seshadri et al. ............. | 375/286 |
| 5,430,760 A | * | 7/1995 | Dent ........................... | 375/144 |
| 5,715,526 A | * | 2/1998 | Weaver et al. ............... | 455/126 |
| 5,886,988 A | * | 3/1999 | Yun et al. ................... | 370/329 |
| 6,031,913 A | * | 2/2000 | Hassan et al. ................ | 380/44 |
| 6,049,633 A | * | 4/2000 | Cho ............................ | 382/247 |
| 6,115,427 A | * | 9/2000 | Calderbank et al. ......... | 375/267 |
| 6,160,791 A | * | 12/2000 | Bohnke ....................... | 370/208 |
| 6,167,031 A | * | 12/2000 | Olofsson et al. ............. | 370/252 |
| 6,185,440 B1 | * | 2/2001 | Barratt et al. ............. | 455/562.1 |
| 6,226,315 B1 | * | 5/2001 | Sriram et al. ................ | 375/140 |

(Continued)

FOREIGN PATENT DOCUMENTS

EP    0544463 A2    6/1993

(Continued)

OTHER PUBLICATIONS

Louis C. Yun et al. "Power Control for Variable QOS on a CDMA Channel" Military Communications Conference, 1994. IEEE Fort Monmouth, NJ, Oct. 2-5, 1994, New York, NY, Oct. 2, 1994, pp. 178-182.

*Primary Examiner*—Doris H. To
*Assistant Examiner*—Ian N. Moore
(74) *Attorney, Agent, or Firm*—Philip Wadsworth; Sandra L. Godsey; Thomas R. Rouse

(57) ABSTRACT

Techniques to reduce transmit power required for transmission of messages from an access terminal to reduce interference to transmissions from other access terminals. In one aspect, messages to be transmitted are defined and/or coded such that they may be detected at different received signal qualities. The codewords may be defined having different distances to their nearest codewords. In another aspect, messages to be transmitted are assigned to different points in a signal constellation, with the points being located such that they may be received at different signal qualities. Codewords that may be received at a lower signal quality may be assigned to messages more likely to be transmitted at higher transmit power levels (e.g., when the access terminal is located further away) or to more frequently transmitted messages.

29 Claims, 7 Drawing Sheets

U.S. PATENT DOCUMENTS

| | | |
|---|---|---|
| 6,236,865 B1 * | 5/2001 | Lu .............................. 455/522 |
| 6,298,092 B1 * | 10/2001 | Heath et al. ................. 375/267 |
| 6,341,125 B1 * | 1/2002 | Hong et al. .................. 370/335 |
| 6,370,387 B1 * | 4/2002 | Reemtsma ................... 455/453 |
| 6,452,914 B1 * | 9/2002 | Niemela ...................... 370/337 |
| 6,463,295 B1 * | 10/2002 | Yun ........................... 455/522 |
| 6,560,459 B1 * | 5/2003 | Wong .......................... 455/447 |
| 6,603,980 B1 * | 8/2003 | Kitagawa et al. ............ 455/522 |
| 6,614,836 B1 * | 9/2003 | Halford et al. .............. 375/152 |
| 6,718,180 B1 * | 4/2004 | Lundh et al. ................ 455/522 |
| 6,760,597 B1 * | 7/2004 | Salvarani et al. ........... 455/522 |
| 6,891,882 B1 * | 5/2005 | Hosur et al. ................. 375/147 |
| 2002/0065062 A1 * | 5/2002 | Levesque .................... 455/343 |
| 2002/0136272 A1 * | 9/2002 | Kanterakis et al. ......... 375/141 |
| 2003/0002446 A1 * | 1/2003 | Komaili et al. ............. 370/252 |
| 2004/0082358 A1 * | 4/2004 | Moulsley et al. ........... 455/522 |

FOREIGN PATENT DOCUMENTS

| | | |
|---|---|---|
| EP | 1065803 A1 | 3/2000 |
| EP | 1050990 A1 | 11/2000 |
| EP | 1217861 A1 | 6/2002 |
| WO | WO 9836508 A1 * | 8/1998 |
| WO | 01/01722 A1 | 1/2001 |

* cited by examiner

| 412 | = | Codeword |
| --- | --- | --- |
| $d_A$ | = | Distance between a pair of adjacent codewords |
| $P_S$ | = | Transmit Power |
| $P_N$ | = | Noise |

METHOD AND APPARATUS FOR TRANSMITTING MESSAGES IN A WIRELESS COMMUNICATION SYSTEM

BACKGROUND

I. Field

The present invention relates to data communication. More particularly, the present invention relates to a novel and improved method and apparatus for transmitting messages in a wireless communication system.

II. Description of the Related Art

Wireless communication systems are widely deployed to provide various types of communication such as voice, data, and so on. These systems may be based on code division multiple access (CDMA), time division multiple access (TDMA), or some other modulation techniques. A CDMA system provides certain advantages over other types of system, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the "TIA/EIA-98-C Recommended Minimum Standard for Dual-Mode Wideband Spread Spectrum Cellular Mobile Station" (the IS-98 standard), (3) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (4) the standard offered by a consortium named "3rd Generation Partnership Project 2" (3GPP2) and embodied in a set of documents including "TR-45.5 Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (5) some other standards. These standards are incorporated herein by reference. A system that implements the High Rate Packet Data specification of the cdma2000 standard is referred to herein as a high data rate (HDR) system. Proposed wireless systems also provide a combination of HDR and low data rate services (such as voice and fax services) using a single air interface.

In a wireless communication system, the transmit power required for a transmission is dependent on the propagation (or path) loss between a transmitting entity (e.g., an access terminal) and a receiving entity (e.g., an access point). As an access terminal moves further away from the access point, the path loss typically increases. Consequently, more transmit power is required so that the transmission can be received at the required signal quality for the desired level of performance (e.g., one percent frame error rate). However, the higher transmit power for this transmission causes more interference to the transmissions from other access terminals. The higher transmit power also causes faster depletion of battery power on mobile wireless devices. There is, therefore, a need in the art for a way to provide HDR services that minimizes interference and depletion of battery power.

SUMMARY

The disclosed embodiments provide techniques to reduce the amount of transmit power required for transmission of selected messages from an access terminal. In a first aspect, the reduction in transmit power is based on the expected path loss associated with the reverse link, thus tending to extend the operating range of an HDR access terminal, and at the same time decreasing reverse link interference in adjacent cells. In another aspect, the reduction in transmit power is based on the relative frequency with which an HDR access terminal is expected to send each type of message, thus tending to minimize reverse link interference in a serving cell. Both of these aspects also have the benefit of tending to extend battery life of a mobile wireless device such as a mobile HDR access terminal. The techniques described herein can also be applied to forward link transmissions from an access point. Various other aspects of the invention are also presented.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
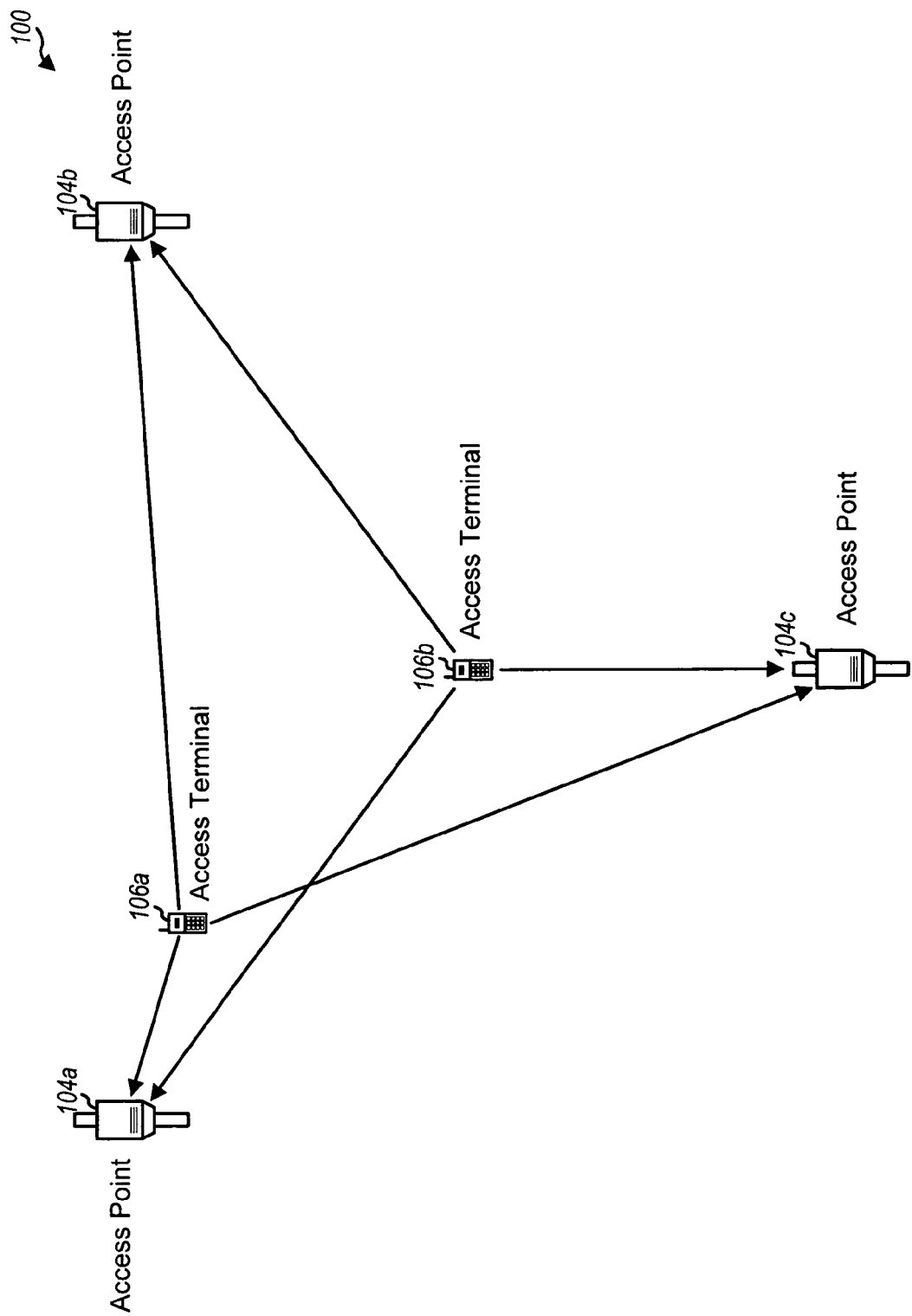
FIG. 1 is a diagram of a wireless communication system that supports a number of users, and which can implement various aspects of the invention.

FIG. 1 is a diagram of a wireless communication system 100 that supports a number of users, and which can implement various aspects of the invention. System 100 may be designed to support one or more CDMA standards and/or designs (e.g., the cdma2000 standard, the HDR specification). For simplicity, system 100 is shown to include three access points 104 (which may also be referred to as base stations) in communication with two access terminals 106 (which may also be referred to as remote terminals or mobile stations). The access point and its coverage area are often collectively referred to as a "cell".

Depending on the CDMA system being implemented, each access terminal 106 may communicate with one (or possibly more) access points 104 on the forward link at any given moment, and may communicate with one or more access points on the reverse link depending on whether or not the access terminal is in soft handoff. The forward link (i.e., downlink) refers to transmission from the access point to the access terminal, and the reverse link (i.e., uplink) refers to transmission from the access terminal to the access point.

In a CDMA system, the cells may be operated on the same frequency band (i.e., with a frequency reuse of one, or K=1) to achieve better utilization of the available system resources. In this case, the transmission from each transmitting entity (e.g., access terminal) acts as interference to the transmissions from other transmitting entities. To minimize interference and increase system capacity on the reverse link, the transmit power of each transmitting access terminal is controlled such that a desired level of performance (e.g., one percent frame error rate, or 1% FER) is achieved while minimizing the amount of interference to other transmitting access terminals. This transmit power adjustment is achieved by a power control loop maintained for each transmitting access terminal. The power control loop adjusts the transmit power level of the access terminal such that a transmission is received by the access point at a target signal quality (i.e., a particular signal-to-noise-plus-interference, C/I) needed for the desired level of performance.

In the example shown in FIG. 1, access terminal 106a is located near access point 104a, and access terminal 106b is located near the cell boundaries of access points 104a, 104b, and 104c. For this example, both access terminals are using the same coding and modulation to transmit. Since access terminal 106a is located (relatively) close to access point 104a, its transmit power may be adjusted to a (relatively) low level to achieve the desired level of performance at access point 104a. This low transmit power is possible since the path loss is approximately proportional to the $4^{th}$ law of the distance between the transmitting and receiving entities (i.e., path loss $\propto$ (distance)$^4$). Because of the low transmit power level and further because of the greater distances between access terminal 106a and access points 104b and 104c, the transmission from access terminal 106a causes little interference to other transmissions received at access points 104b and 104c.

In contrast, access terminal 106b is located further away from access points 104a, 104b, and 104c. Due to the longer distances to these access points, the transmit power of access terminal 106b is likely to be adjusted to a high level to achieve the same level of performance. Because of the high transmit power level and the shorter distances between access terminal 106b and access points 104b and 104c, the transmission from access terminal 106b is likely to cause more interference to other transmissions received at access points 104b and 104c.

As seen by the above example, when an access terminal is located near an access point, less transmit power is required for a transmission, and the transmission causes little interference at other access points. In contrast, when an access terminal is located further away from an access point, more transmit power is required for a transmission, and the transmission causes more interference at other access points.

Various techniques are provided herein to reduce the amount of transmit power required for transmission of messages from an access terminal, which then results in less interference to the transmissions from other access terminals. Some of these techniques are briefly described below.

In one aspect, messages to be transmitted from an access terminal are defined and/or coded such that they may be received by an access point at different received signal qualities. In one implementation, an alphabet of codewords is defined whereby at least some of the codewords have different "distances" to their nearest codewords (i.e., different minimum distances, $d_{min}$). As used herein, an "alphabet" is a collection of individual codewords, each of which (1) is represented by a specific value or sequence of bits, (2) may be associated with a particular meaning by a system (e.g., a particular data rate), and (3) is selectable for transmission as all or a part of a message. For digital codes, minimum distance, $d_{min}$, relates to the minimum number of bit errors in a received codeword necessary to cause an equal or greater correlation with an incorrect codeword. Minimum distance, $d_{min}$, may also refer to the distance between points in a (typically multi-dimensional) signal constellation. A codeword with a larger minimum distance may be correctly detected at a lower signal quality, and a codeword with a smaller minimum distance typically requires higher signal quality for proper reception.

In certain embodiments, codewords with larger minimum distances may be advantageously assigned to messages more likely to be transmitted by access terminals located further away from the access point, which would normally need to transmit their messages at higher transmit power levels due to greater path loss. This alphabet and codeword assignment scheme allow access terminals to transmit their messages using less power when located further away from the access point, which then reduces the amount of interference to transmissions from other access terminals in adjacent cells and may further extend the range of the access terminal.

In some other embodiments, codewords with larger minimum distances may be advantageously assigned to more frequently transmitted messages. Since these messages may be received at a lower signal quality, they cause less interference to messages from other transmitting access terminals. The reduced interference may increase the capacity of the reverse link.

In another aspect, messages to be transmitted are assigned to different points in a signal constellation. In such an aspect, $d_{min}$ refers to the distance between a point on the signal constellation and the nearest other point in the same signal constellation. The points in the signal constellation may be viewed as codewords in an alphabet, and may be selected from various modulation formats such as quadrature phase shift keying (QPSK), M-ary phase shift keying (e.g., 8-PSK), quadrature amplitude modulation (e.g., 16-QAM, 64-QAM), and others. A custom signal constellation may also be generated having points at various defined locations. The location of the points in the signal constellation may be defined such that the points may be received at different signal qualities (i.e., the points have different distances to their nearest neighbor points). In certain embodiments, messages expected to be transmitted at higher transmit power level (e.g., from an access terminal located further away from an access point and having greater path loss) are assigned to points that may be received at lower signal qualities, and thus may be transmitted at lower transmit power. And in some other embodiments, more frequently transmitted messages are assigned to points that may be received at lower signal qualities, which may result in less interference and increased link capacity.

In yet another aspect, the transmit power used to transmit a message is adjusted by varying the length of the codeword used, and hence the length of the transmit duration. For example, messages to be transmitted from an access terminal are defined with different lengths. In one implementation, an alphabet of codewords is defined whereby at least some of the codewords have different lengths. For a given link condition, a shorter length codeword may be transmitted at the same transmit power level but over a shorter time interval relative to a longer length codeword, or at a lower transmit power level over the same time interval. Shorter length codewords may be assigned to messages more likely to be transmitted by an access terminal located further away from an access point, which would tend to reduce the amount of interference in the system. Alternatively or additionally, shorter length codewords may be assigned to more commonly transmitted messages, which would also tend to extend the battery life of the access terminal.

The message transmission schemes described herein may be used for any set of defined messages to be transmitted on any channel on the forward or reverse link. These message transmission schemes may also be used for other wireless communication systems and for other CDMA systems that may support one or more other CDMA standards and/or designs.

For clarity, various aspects, embodiments, and features of the invention are now described for a specific implementation in conjunction with a Data Rate Control (DRC) channel defined for the reverse link in a High Data Rate (HDR) system. The disclosed aspects and embodiments may be equally applied to other types of system, such as a hybrid system that supports high rate packet data services and voice services concurrently or other types of systems mentioned above.

In the HDR system, each access point transmits packet data to access terminals within its coverage, one at a time, in a time-division multiplexed manner. An access point transmits packet data to an access terminal at or near the peak transmit power level, if at all. Whenever an access terminal desires a data transmission, it sends a packet data request in the form of a DRC message to a selected access point. The access terminal measures the signal quality of the forward link signals (e.g., the pilot references) received from a number of access points, determines the access point having the best received signal quality, identifies the highest data rate supported by the best received link, and sends a DRC message indicative of the identified data rate. This DRC message is transmitted on the DRC channel and directed to the selected access point associated with the best received signal quality. The selected access point receives the DRC message and schedules a data transmission for the access terminal at the identified data rate.

As shown in FIG. 1, access terminal 106a is located (relatively) close to access point 104a and likely to experience smaller path loss. To maintain the desired level of performance while minimizing interference to other transmitting access terminals, the transmission from each access terminal is power controlled such that it is received at the target signal quality needed for the desired level of performance. Because of the smaller path loss, access terminal 106a is able to transmit the DRC message for the identified data rate at a lower transmit power level and still be received by the access point at the target signal quality. In contrast, access terminal 106b is located further away from access point 104a and likely to experience greater path loss. Because of the greater path loss, access terminal 106b is required to transmit the DRC message at a higher transmit power level to achieve the target signal quality.

Figure 2:
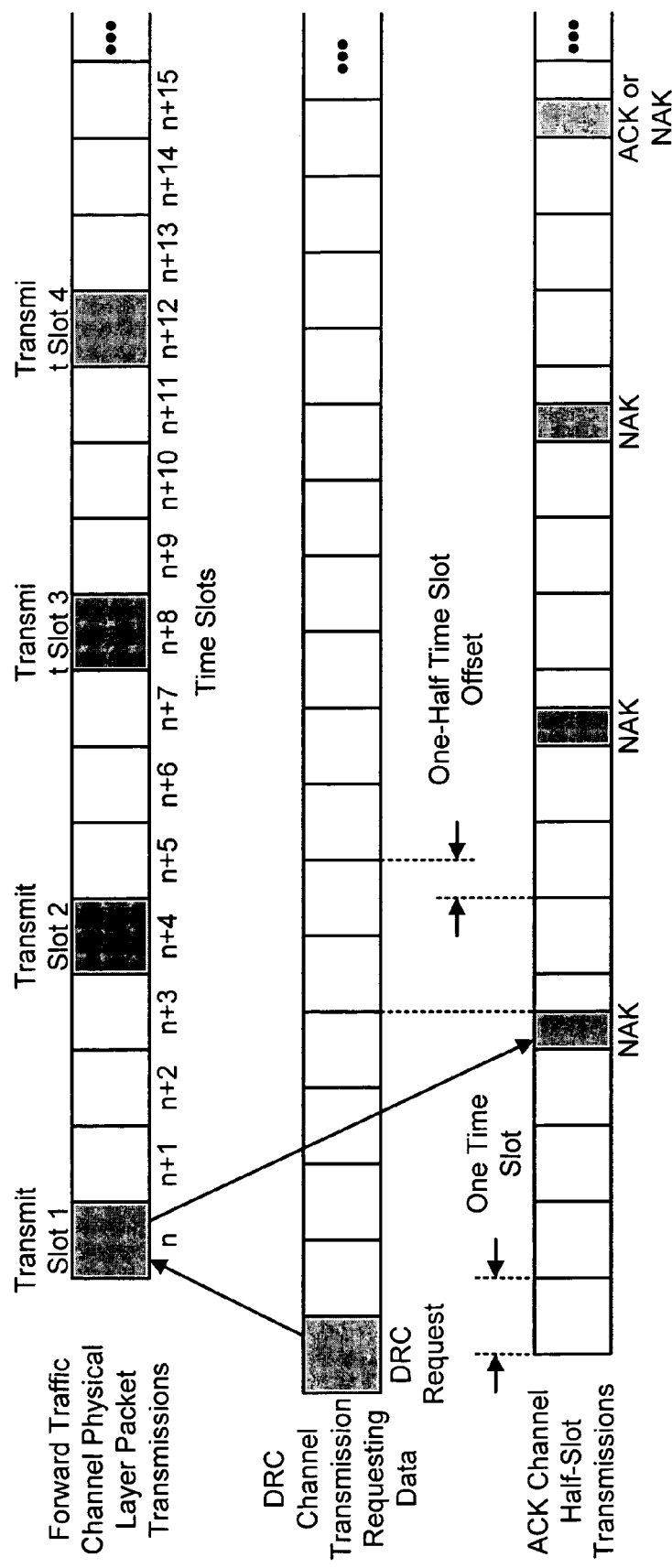
FIG. 2 is a diagram of a packet transmission scheme used in the HDR system.

FIG. 2 is a diagram of a packet transmission scheme used in the HDR system. Initially, a request for a data transmission is received from an access terminal. In response, one or more Physical Layer packets are generated by an access point and transmitted to the access terminal starting at time slot n. Each packet includes a particular number of data bits (e.g., 1024 bits in the HDR system) and may be transmitted as one or more "slots". The number of slots for each packet is dependent on the data rate, and four slots are included in the example packet shown in FIG. 2. For each slot, the access terminal receives and processes (e.g., decovers, demodulates, deinterleaves, and decodes) the slot, and further determines whether the packet has been received correctly. The access terminal is able to recover the transmitted packet based on a partial transmission because the data modulation symbols generated for the packet are repeated a number of times for lower data rates and transmitted.

In an HDR system, each access terminal desiring a data transmission continually measures the received quality of forward link signals received from one or more access points. The access terminal then directs DRC messages to the access point having the best measured forward link signal quality. The DRC message transmission continues until the requested data transmission is successfully received by the access terminal. A portion of the reverse link capacity is utilized for this continual transmission of DRC messages by access terminals requesting data transmissions.

In an exemplary embodiment, a DRC message identifies the particular access point from which data is being requested, and also indicates the data rate at which that data should be transmitted, if at all. An access point receives DRC requests from multiple access terminals during each time slot, but transmits to only one access terminal per time slot. Because the access terminal might not receive a forward link transmission in response to each DRC message, the access terminal continuously sends DRC messages in every time slot. If the access terminal fails to send a DRC message in a reverse link time slot, it will generally not receive any forward link data in the corresponding forward link time slot.

Figure 3:
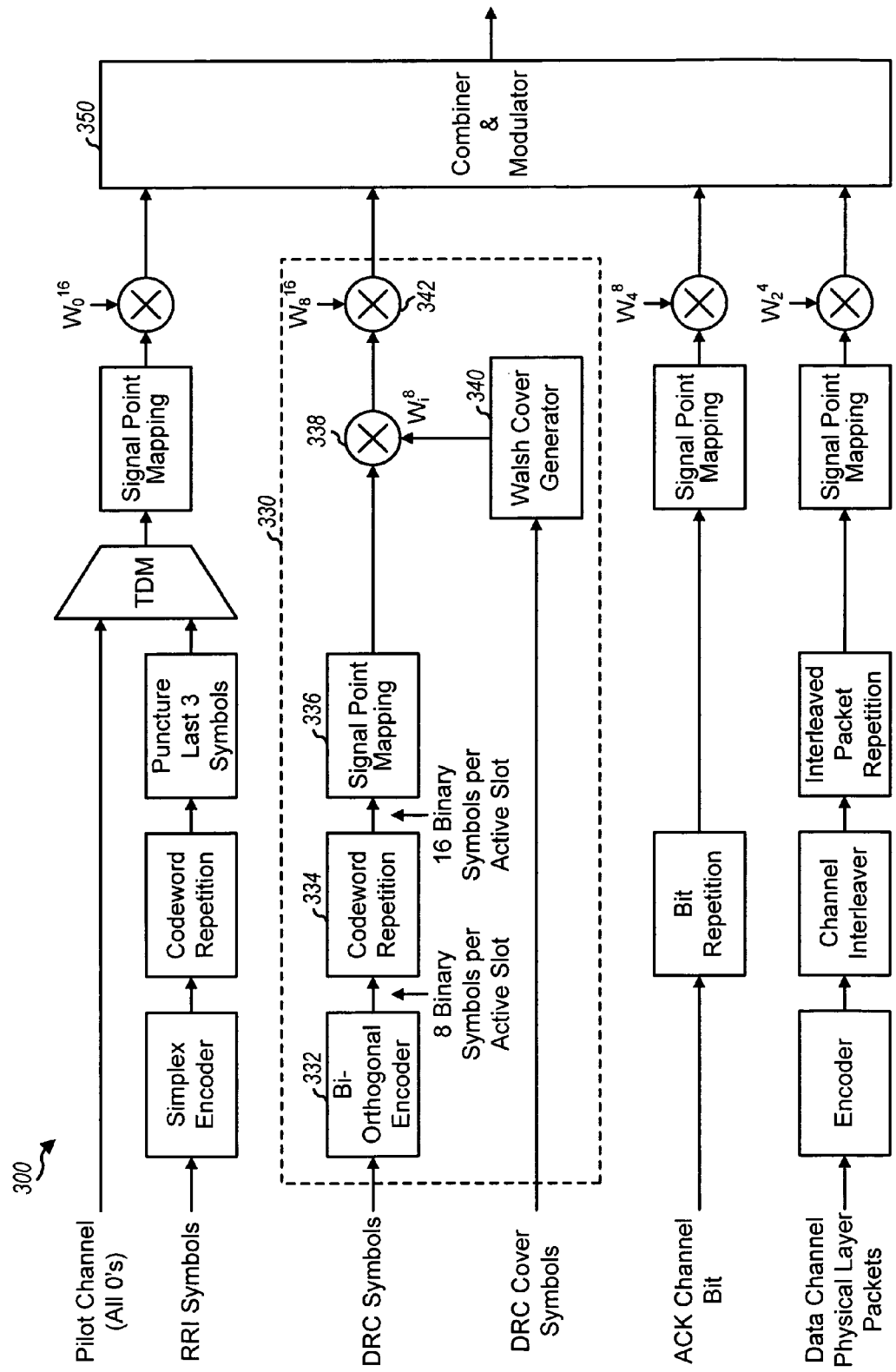
FIG. 3 is a block diagram of a reverse link architecture employed in the HDR system and capable of transmitting data rate control (DRC) messages and other information.

FIG. 3 is a block diagram of a reverse link architecture employed in the HDR system and capable of transmitting DRC messages and other information (e.g., pilot, reverse rate indicator (RRI), acknowledgment (ACK), and packet data). Examples of such signal structures are described in detail in the aforementioned cdma2000 standard. For simplicity, only the processing for the DRC message is described herein. The HDR system supports a number of different data rates for data transmission on the forward link. Each of the supported forward link data rates is associated with a respective DRC value. In the cdma2000 standard, each of 16 possible DRC values is represented by a 4-bit value. A DRC processor 330 receives the DRC value for the identified data rate, which represents a message to be transmitted, and provides a code sequence for the message.

Within DRC processor 330, the DRC value is mapped to an assigned 8-bit bi-orthogonal codeword (or DRC codeword) by a bi-orthogonal encoder 332. The 8-bit DRC codeword is then repeated twice in block 334 to generate 16 binary symbols to be transmitted per active slot. The binary symbols are then mapped (e.g., "0"→+1, and "1"→−1) by a signal mapping element 336. Each mapped binary symbol is further covered by a coverer 338 with a particular 8-ary Walsh function, $W_i^8$, provided by a Walsh cover generator 340. This Walsh function, $W_i^8$, is the one assigned to the selected access point having the best link to the access terminal.

The 16 binary symbols in the two repeated DRC codewords are used to generate 128 Walsh chips by coverer 338. Each Walsh chip is further covered by a coverer 342 with a 16-bit Walsh function, $W_8^{16}$ (i.e., a sequence of "1111111100000000"). The 128 Walsh chips from coverer 338 for each active slot are thus covered to generate 2048 chips. The sequence of 2048 chips for the DRC message is then combined with other data within a combiner and modulator 350, modulated, and transmitted over one time slot, which is defined as 1.667 msec in the cdma2000 standard.

Table 1 lists the 16 DRC values and their corresponding DRC codewords, as defined in the cdma2000 standard. As noted above, the DRC values are representative of the forward link data rates, with the mapping between the data rates and DRC values being defined in the cdma2000 standard.

TABLE 1

| DRC Value | DRC Codeword |
|---|---|
| 0 | 0000 0000 |
| 1 | 1111 1111 |
| 2 | 0101 0101 |
| 3 | 1010 1010 |
| 4 | 0011 0011 |
| 5 | 1100 1100 |
| 6 | 0110 0110 |
| 7 | 1001 1001 |
| 8 | 0000 1111 |
| 9 | 1111 0000 |
| 10 | 0101 1010 |
| 11 | 1010 0101 |
| 12 | 0011 1100 |
| 13 | 1100 0011 |
| 14 | 0110 1001 |
| 15 | 1001 0110 |

Table 2 lists the 8-ary Walsh functions, $W_i^8$, that may be assigned to the access points. By covering the DRC codeword for the identified data rate with the specific Walsh function, $W_i^8$, assigned to the selected access point, the selected and neighbor access points are able to easily determine whether or not the DRC message has been sent to them. Only the access point assigned with that Walsh function, $W_i^8$, processes the DRC message for scheduling data to the access terminal.

TABLE 2

| Walsh Function | Walsh Sequence |
|---|---|
| $W_0^8$ | 0000 0000 |
| $W_1^8$ | 0101 0101 |
| $W_2^8$ | 0011 0011 |
| $W_3^8$ | 0110 0110 |
| $W_4^8$ | 0000 1111 |
| $W_5^8$ | 0101 1010 |
| $W_6^8$ | 0011 1100 |
| $W_7^8$ | 0110 1001 |

Referring back to Table 1, the DRC codewords are selected such that each codeword (e.g., "0000 0000") differs from its compliment (e.g., "1111 1111") by eight bit positions, and further differs from all other codewords by four bit positions. For this "alphabet" of 16 DRC codewords, the minimum distance, $d_{min}$, between the codewords is equal to four. For a transmitted DRC codeword, an access point is able to correctly detect the codeword if fewer than $d_{min}/2$ bits in the codeword are received in error. Otherwise, if $d_{min}/2$ or more bits are received in error, the codeword may be erroneously detected.

In accordance with an aspect of the invention, an alphabet of codewords is defined such that at least some of the codewords have a variety of different minimum distances. For this alphabet, the minimum distances for some codewords are smaller than average while the minimum distances for some other codewords are larger than average. A codeword with a smaller minimum distance must be received at a higher power level to achieve a higher C/I needed for the desired level of performance (e.g., 1% FER). Correspondingly, a codeword with a larger minimum distance may be received at a lower power level since a lower C/I is required for the same level of performance.

In certain embodiments, codewords with larger minimum distances are assigned to messages more likely to be sent by access terminals which would have required higher transmit power levels (e.g., by access terminals located further away from the access point and experiencing greater path loss). In other embodiments, codewords with smaller minimum distances are assigned to more frequently transmitted messages.

Figure 4A:
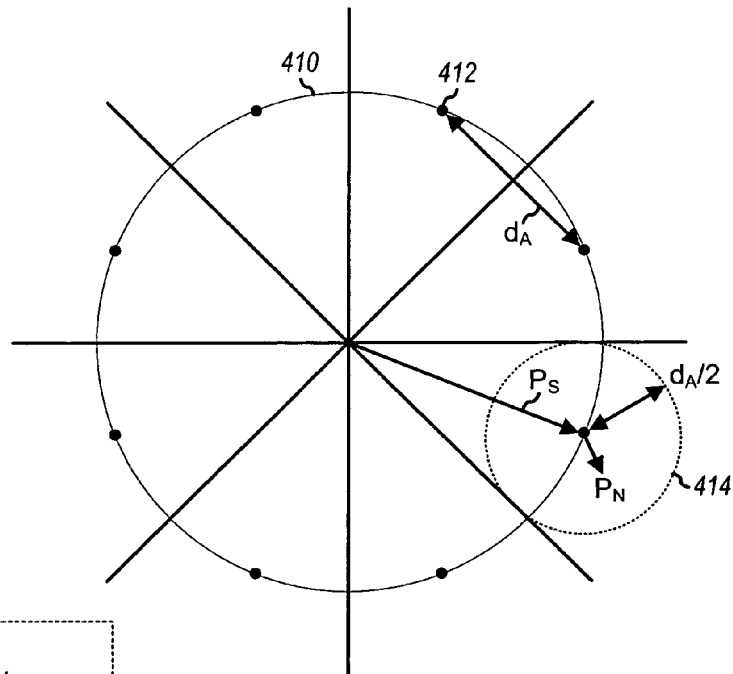
FIGS. 4A and 4B are diagrams graphically illustrating an alphabet of codewords having equal distance and unequal distances, respectively, to the nearest codewords.

FIG. 4A is a diagram graphically illustrating an alphabet of codewords having equal minimum distance to the nearest codewords. In this example, the codewords are represented as points 412 equally spaced on a circle 410 in a 2-D plane. Because of the equal spacing, the distance between any pair of adjacent codewords is $d_A$. The distance from the center of circle 410 and any particular point 412 can be representative of the transmit power ($P_S$) for the point, and the distance from this point outward (i.e., toward the edge of a circle 414) can be representative of noise ($P_N$). In this example, any codeword may be correctly received if the noise is less than $d_A/2$ (i.e., $P_N < d_A/2$). If the noise is greater than or equal to $d_A/2$, the codeword may be erroneously detected as another codeword (i.e., an adjacent codeword). Because of the equal codeword spacing, the codewords in this alphabet are equally susceptible to noise. Thus, the same received signal quality (C/I) is required for each codeword for a particular desired level of performance.

Figure 4B:
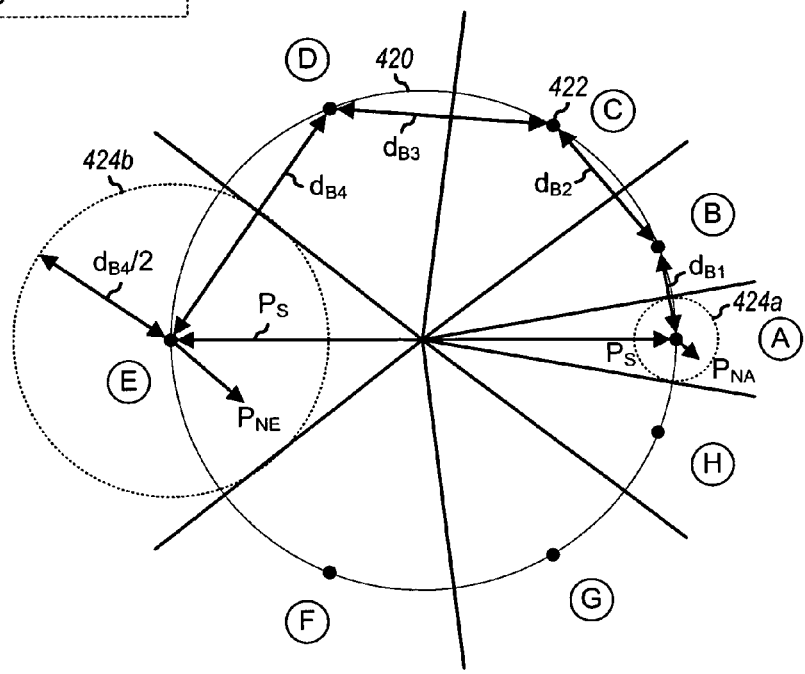

FIG. 4B is a diagram graphically illustrating an alphabet of codewords having unequal distances to the nearest codewords. In this example, the codewords are represented as points 422 unequally spaced on a circle 420 in the 2-D plane. The eight codewords are spaced such that the distance between each pair of adjacent codewords ranges from $d_{B1}$ to $d_{B4}$, where $d_{B1} < d_{B2} < d_{B3} < d_{B4}$. Codeword A has the smallest distance, $d_{B1}$, to the nearest codewords B and H, and is more susceptible to noise. This codeword may be correctly received if the noise is less than $d_{B1}/2$ (i.e., $P_{NA} < d_{B1}/2$). Consequently, a higher received signal quality (C/I) is needed for the desired level of performance.

In contrast, codeword E has the largest distance, $d_{B4}$, to the nearest codewords D and F, and is less susceptible to noise. This codeword may be correctly received if the noise is less than $d_{B4}/2$ (i.e., $P_{NE} < d_{B4}/2$). Thus, a lower received signal quality is needed for the same level of performance, which allows this codeword to be transmitted at a lower transmit power level.

The examples of FIGS. 4A and 4B were chosen because they are easy to graphically illustrate on a flat sheet of paper. A person skilled in the art will appreciate that the same principles also apply to coding over any other single or multi-dimensional spaces where a distance metric can be defined.

Referring back to FIG. 1, access terminal 106a is located (relatively) close to access point 104a. Because of the smaller path loss, access terminal 106a is likely to request transmission at a high data rate (e.g., 614.4 kbps or higher) from this access point. In contrast, access terminal 106b is located further away from access point 104a. Because of the greater path loss, access terminal 106a is likely to request transmission from this access point at a lower data rate (e.g., 76.8 kbps or lower).

If, as is the case in the cdma2000 standard, the minimum distance between the DRC codewords is relatively uniform, then all codewords must be transmitted by the access terminals such that they are received by the access point at the target signal quality. This is achieved by controlling the transmit power such that codewords from access terminals with greater path loss are transmitted at higher transmit power levels, and codewords from access terminals with smaller path loss are transmitted at lower transmit power levels. For the example shown in FIG. 1, if both access terminals 106a and 106b concurrently request data transmission from access point 104a, access terminal 106b would transmit its DRC message at a higher transmit power level than would access terminal 106a to achieve the target received signal quality at access point 104a.

The path loss versus distance is approximately equal for the forward and reverse links. Consequently, a DRC message for a progressively lower data rate is (disadvantageously but necessarily) transmitted at a progressively higher transmit power level. This could cause more interference to reverse link signals of cells adjacent to access point 104a. The higher transmit power for a longer time period may further shorten the access terminal's operating life if it is a mobile unit operating on battery power.

Table 3 lists an alphabet whereby at least some of the codewords have unequal minimum distances, and which may be used for the DRC messages. In this example, the alphabet includes 16 codewords {A, B, . . . P} assigned to the 16 DRC values {0, 1, . . . 15}. These 16 codewords may be used for up to 16 data rates {$R_0$, $R_1$, . . . $R_{15}$}. Each codeword in the alphabet has a particular distance $d_X$ to the nearest codeword (i.e., a particular minimum distance), which is listed in columns 4 and 8 of Table 3.

TABLE 3

| DRC Value | Data Rate | Codeword | Minimum Distance |
|---|---|---|---|
| 0 | $R_0$ | A | $d_0$ |
| 1 | $R_1$ | B | $d_1$ |
| 2 | $R_2$ | C | $d_2$ |
| 3 | $R_3$ | D | $d_3$ |
| 4 | $R_4$ | E | $d_4$ |
| 5 | $R_5$ | F | $d_5$ |
| 6 | $R_6$ | G | $d_6$ |
| 7 | $R_7$ | H | $d_7$ |
| 8 | $R_8$ | I | $d_8$ |
| 9 | $R_9$ | J | $d_9$ |
| 10 | $R_{10}$ | K | $d_{10}$ |
| 11 | $R_{11}$ | L | $d_{11}$ |
| 12 | $R_{12}$ | M | $d_{12}$ |
| 13 | $R_{13}$ | N | $d_{13}$ |
| 14 | $R_{14}$ | O | $d_{14}$ |
| 15 | $R_{15}$ | P | $d_{15}$ |

In an embodiment, the codewords for the alphabet are defined such that the minimum distances for the codewords maintain the following relationships:

$$d_0 \geq d_1 \geq d_2 \geq \ldots \geq d_{13} \geq d_{14} \geq d_{15}, \text{ and}$$

$$d_0 > d_{15}.$$

As shown by the above relationships, at least some (and not necessarily all) of the codewords in the alphabet have different minimum distances.

In certain embodiments, the codewords in the alphabet are assigned such that messages more likely to be transmitted at higher transmit power levels are assigned to codewords having larger minimum distances. As noted above, for the DRC messages, progressively higher transmit power levels are typically needed for progressively lower data rates. Thus, in an embodiment, the codewords are assigned to the data rates such that codewords with progressively larger minimum distances are assigned to progressively lower data rates. For the codeword assignment shown in Table 3, the data rates may be defined to maintain the following relationship:

$$R_0 \leq R_1 \leq R_2 \leq \ldots \leq R_{13} \leq R_{14} \leq R_{15}.$$

Based on the above alphabet and codeword assignment, an access terminal located further away from an access point is likely to request data transmission at a lower data rate, which would be assigned with a codeword having a larger minimum distance. This codeword may then be transmitted at a lower relative transmit power level than would otherwise be required for a codeword with an average minimum distance.

The above embodiment can be extended to any type of transmission on the forward link where different codewords correspond to transmissions requiring different C/I. Codeword assignment based on data rates is applicable for the HDR system because, to be received with equal quality, low data rates require lower C/I than high data rates. Thus, the HDR system assigns lower data rates to users located far from the access point. The codeword assignment can be based on the required C/I in some other manner. For example, a particular system may assign all users the same data rate, but different spreading codes. If the spreading codes are not the same, the users close to the access point can be assigned (not quite as good) spreading codes that are more susceptible to be interfered than the ones assigned to users located far away. The same concept can be applied to an FDMA system, where some frequency bands (e.g., unlicensed frequency bands) have more interference than others.

In some other embodiments, codewords in the alphabet are assigned such that messages more frequently transmitted are assigned to codewords having larger minimum distances. This allows commonly transmitted messages to be transmitted at lower power levels, which may reduce interference and increase link capacity.

In the above-described HDR system, the 8-bit DRC code word is repeated and covered twice to generate 2048 chips for each active time slot. For an alphabet having codewords with different minimum distances, the codewords can be defined to have lengths of 8, 16, 32, 64, and so on, up to 2048 bits. Longer codeword length generally provides more flexibility in selecting a set of codewords having varying minimum distances. Codewords of any length may be used and are within the scope of the invention.

Table 4 shows an example of a simple alphabet with four codewords having different distances to the nearest codewords. In this example alphabet, codeword A has distances of 4, 3, and 3 to codewords B, C, and D, respectively. Codeword B has distances of 4, 1, and 1 to codewords A, C, and D, respectively. Because of the larger distance to other codewords in the alphabet, codeword A may be correctly received at a lower C/I. This allows codeword A to be transmitted at a lower transmit power level. Codeword A may thus be advantageously assigned to the lowest supported data rate (e.g., 38.4 kbps). The remaining codewords may be assigned to the other supported data rates in a similar manner based on their minimum distances.

TABLE 4

| DRC Value | Data Rate | Codeword | Sequence |
|---|---|---|---|
| 0 | 38.4 kbps | A | 0000 |
| 1 | 76.8 kbps | B | 1111 |
| 2 | 153.6 kbps | C | 1110 |
| 3 | 307.2 kbps | D | 0111 |

In accordance with another aspect of the invention, messages to be transmitted are assigned to different points in a signal constellation. The signal constellation may include points from various modulation formats such as, for example, QPSK, 8-PSK, 16-QAM, 32-QAM, 64-QAM, and others. The location of the points in the signal constellation and the assignment of the points to the messages may be dependent on various factors such as, for example, the expected transmit power level for the messages, the frequency of the messages, and so on.

Figure 5A:
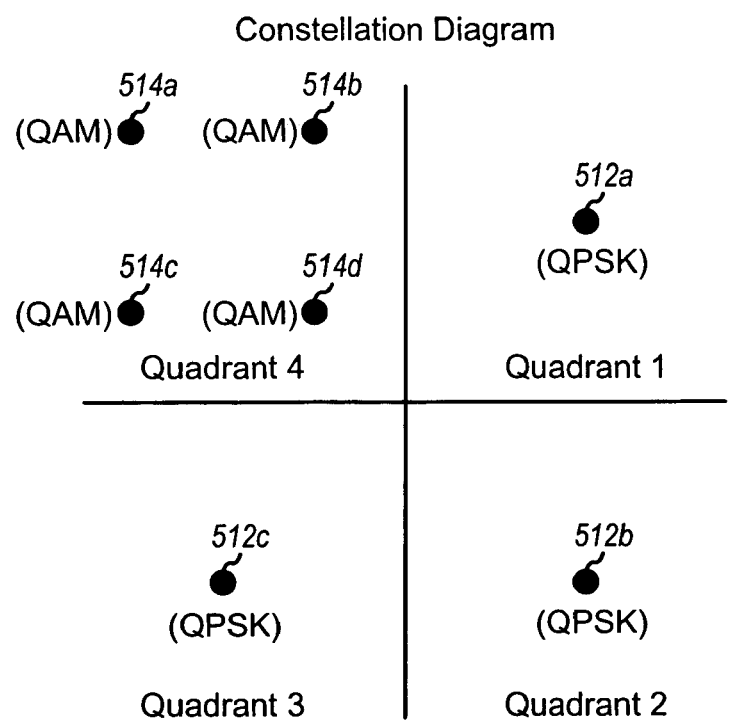
FIGS. 5A and 5B are diagrams of two signal constellations having points selected from different modulation formats.

FIG. 5A is a diagram of a signal constellation having seven points selected from two different modulation formats. In this diagram, each point in the signal constellation is associated with a respective message that may be transmitted. In quadrants 1, 2, and 3, QPSK is employed and three different messages are assigned to points 512a, 512b, and 512c. And in quadrant 4, 16-QAM is employed and four different messages are assigned to points 514a, 514b, 514c, and 514d.

As seen in FIG. 5A, the points are closer to one another as the modulation order increases from QPSK to 16-QAM. The larger distance between points 512a, 512b, and 512c for QSPK results in these points being more immune to erroneous detection due to noise. Note that in the example shown in FIG. 5A, the minimum distance for point 512b is greater than the minimum distance for points 512a and 512c. The points in the constellation need not be arranged in rectangular fashion as shown, but may be arranged in any way that produces the desired relative transmit levels. For example, a double-log scale (i.e., log in the x and y coordinates) may be used to define the points in the constellation to produce approximately even reduction in the minimum distance.

Some QPSK points may be transmitted at a lower transmit power level than others. These QPSK points may be assigned to messages likely to be transmitted at higher transmit power level (e.g., from an access terminal located further away from an access point). Alternatively, the QPSK points may be assigned to more frequently transmitted messages, which would result in less interference at the access point since these messages may be transmitted with less power due to the larger minimum distance. Conversely, the smaller distance between points 514a, 514b, 514c, and 514d for 16-QAM results in these points being more susceptible to erroneous detection due to noise (relative to QPSK). As a result, these 16-QAM points may be transmitted at a higher transmit power level than for the QPSK points.

Figure 5B:
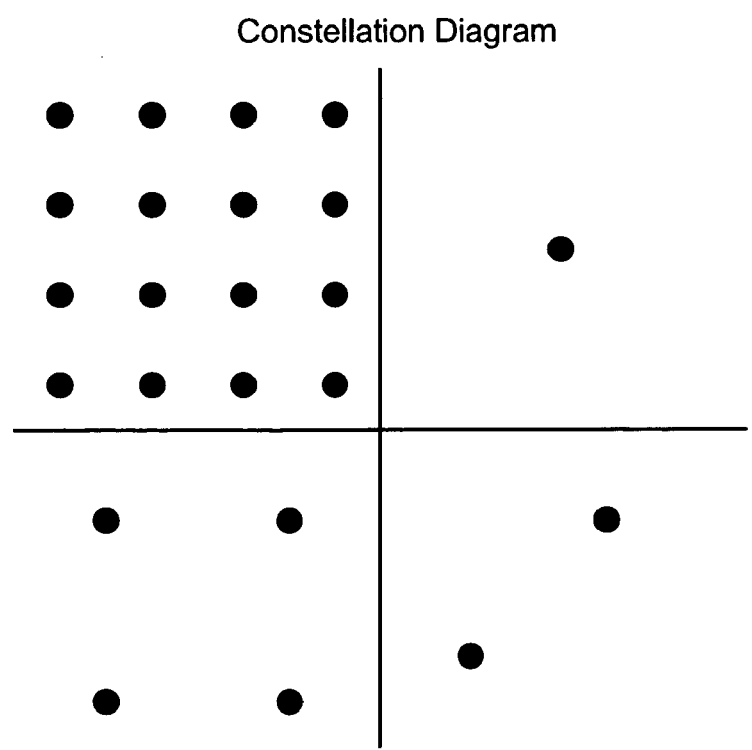

FIG. 5B is a diagram of a signal constellation having 23 points selected from four different modulation formats. As seen in FIG. 5B, the points are closer to one another as the modulation order increases from QPSK to 8-PSK, to 16-QAM, and to 64-QAM. Again, points with larger distances to neighbor points may be transmitted at lower transmit power level, and may be assigned to messages more likely to be transmitted at higher transmit power (e.g., messages likely to be sent by remote terminals located further away from the access point). Conversely, points with smaller distance to neighbor points are transmitted at higher transmit power level, and may be assigned to messages more likely to be transmitted at lower transmit power (e.g., messages likely to be sent by remote terminals located closer to the access point).

Other signal constellations may also be defined for any set of messages. The points in the signal constellation may be defined such that the distance between any particular point and its nearest neighbor point is based on the transmit power level expected to be used for that message. Messages expected to be transmitted at higher transmit power level are associated with points having larger distances to the nearest neighbor.

In accordance with yet another aspect of the invention, messages to be sent from an access terminal are associated with codewords having varying lengths. For a particular link condition, the shorter length codewords may be transmitted at the same transmit power level but over shorter time intervals relative to the longer length codewords. The shorter length codewords may also be transmitted at the same transmit power level, but could be repeated and then punctured similar to that performed for the reverse link in the IS-95 system. Alternatively, these shorter length codewords may be transmitted over the same time interval as that of longer length codewords, but at reduced transmit power levels. Shorter length codewords may be assigned to more commonly transmitted messages, which would tend to reduce the amount of interference in the system. Alternatively or additionally, shorter length codewords may be assigned to messages more likely to be transmitted at higher transmit power by access terminals located further away from the access point, which would also tend to reduce the amount of interference. The codewords may be encoded prior to transmission.

The codewords may be defined based on the probability of occurrence of the associated messages. A message with a higher probability of occurrence may be associated with a shorter length codeword, and a message with a lower probability of occurrence may be associated with a longer length codeword. The generation of these codewords may be achieved in a manner similar to that used to generate a Huffman code, which is known in the art and not described herein.

Referring back to FIG. 1, the areas further away from the access points comprise a larger portion of the system's coverage area than the areas near the access points. If the access terminals are equally likely to be located anywhere throughout the coverage area of the system (and even if this is not true), more of the terminals are likely to be located further from the cell. These access terminals are also likely to request data transmissions at lower data rates.

Table 5 lists an example of an alphabet of codewords having varying lengths and assigned to the DRC values. In this example, the DRC values 0 through 15 are assumed to be decreasingly likely to be sent. Thus, the most likely DRC value of 0 is assigned with a codeword having the shortest length of 2, the next most likely DRC value of 1 is assigned with a codeword having the next shortest length of 3, and so on, and the least likely DRC value of 15 is assigned with a codeword having the longest length of 7.

TABLE 5

| DRC Values | Codeword |
|---|---|
| 0 | 00 |
| 1 | 010 |

TABLE 5-continued

| DRC Values | Codeword |
|---|---|
| 2 | 0110 |
| 3 | 0111 |
| 4 | 1000 |
| 5 | 1001 |
| 6 | 10100 |
| 7 | 10101 |
| 8 | 10110 |
| 9 | 10111 |
| 10 | 110000 |
| 11 | 110001 |
| 12 | 110010 |
| 13 | 110011 |
| 14 | 1101000 |
| 15 | 1101001 |

In one embodiment, the shorter length codewords are transmitted within a shorter time period corresponding to their lengths. In another embodiment, the shorter length codewords are transmitted within the same time interval as the longer length codewords (e.g., over an entire time slot), but at reduced transmit power levels. In this case, a codeword may be repeated as many times as necessary to fill the available number of chips in the time slot. The longer transmission period allows the shorter length codeword to be transmitted at a lower power level.

Various processing, coding, and/or transmission schemes may be used in conjunction with the variable-length codewords. These schemes may be employed to increase the likelihood of correctly detecting the codewords or to achieve a particular level of performance.

In one scheme, a variable-length codeword is encoded prior to transmission. The encoding may be achieved based on a convolutional code or some other code known in the art. For a given number of coded bits, a shorter length codeword may be encoded with a stronger code than for a longer length codeword. The stronger code allows the encoded codeword to be correctly received at a lower received signal quality, which may allow the codeword to be transmitted at a lower transmit power level.

Figure 6A:
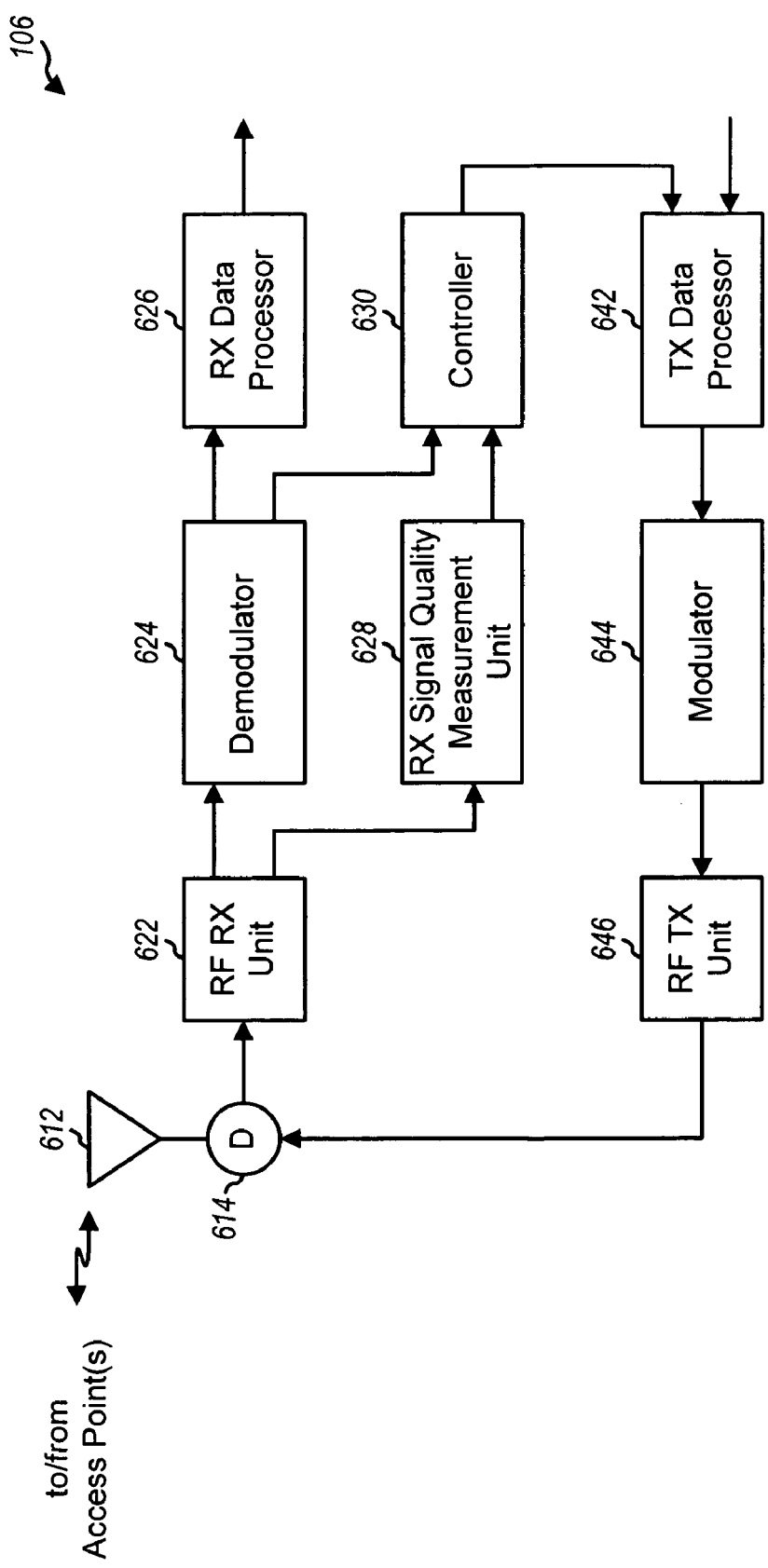
FIG. 6A is a block diagram of an embodiment of an access terminal, in accordance with various aspects of the invention.

FIG. 6A is a block diagram of an embodiment of access terminal 106, which is capable of implementing various aspects of the invention. On the forward link, signals from the access points are received by an antenna 612, routed through a duplexer 614, and provided to an RF receiver unit 622. RF receiver unit 622 conditions (e.g., filters, amplifies, and downconverts) and digitizes the received signal to provide samples. A demodulator 624 receives and processes (e.g., despreads, decovers, and pilot demodulates) the samples to provide recovered symbols. Demodulator 624 may implement a rake receiver that processes multiple instances of the received signal and generates combined recovered symbols. A receive data processor 626 then decodes the recovered symbols, checks the received frames, and provides the output data.

The samples from RF receiver unit 622 may also be provided to an RX signal quality measurement unit 628 that measures the quality of the received signals from the access points (e.g., based on the received pilots). The signal quality measurement can be achieved using various techniques, including those described in U.S. Pat. Nos. 5,056,109 and 5,265,119.

Controller 630 receives the signal quality measurements for the access points, determines the best received link based on the signal quality measurements, determines the data rate supported by the best received link, and determines the codeword associated with the data rate. The codeword is then provided to a transmit data processor 642 for processing and transmission back to the selected access point.

On the reverse link, the message (i.e., codeword) is processed by a transmit (TX) data processor 642, further processed (e.g., spread, modulated) by a modulator (MOD) 644, and conditioned (e.g., converted to analog signals, amplified, filtered, quadrature modulated, and so on) by an RF TX unit 646 to generate a reverse link signal. The reverse link signal is then routed through duplexer 614 and transmitted via antenna 612 to the access points.

Figure 6B:
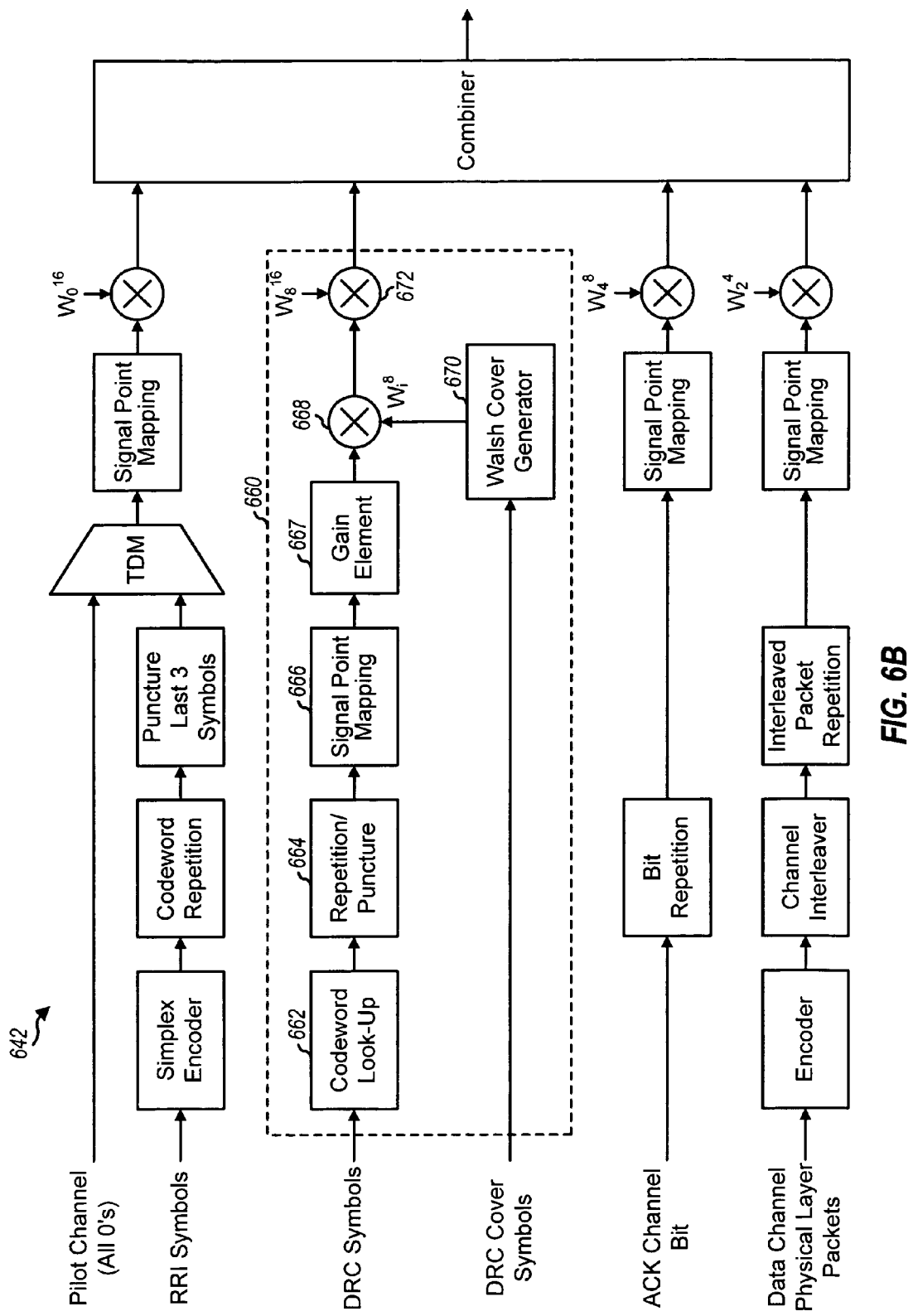
FIG. 6B is a block diagram of an embodiment of a portion of a transmit (TX) data processor, which may be used to process DRC messages for various schemes described herein.

FIG. 6B is a block diagram of an embodiment of a portion of TX data processor 642, which may be used to process DRC messages for various schemes described herein. Within a DRC processor 660, a DRC value for a DRC message (or DRC symbol) is mapped to an assigned codeword by a codeword look-up element 662. The mapped codeword may be one of a number of codewords with different minimum distances or different lengths. Alternatively, the mapped codeword may be representative of a particular point in a signal constellation. Depending on the particular implementation, the mapped codeword may be repeated and/or punctured by a repetition/puncture element 664. For some implementations, repetition/puncture element 664 is not used and may be omitted from DRC processor 660.

The codeword is then mapped by a signal point mapping element 666. For the scheme whereby DRC messages are mapped to different points in the signal constellation, signal point mapping element 666 maps the received codeword to the corresponding point. For other schemes, the codeword may be mapped as described above (e.g., bits in the codeword may be mapped such that "0"→+1, and "1"→−1). The mapped codeword may then be scaled by a gain element 667. As noted above, a codeword with a larger minimum distance may be transmitted with less transmit power, and this codeword would be scaled smaller by gain element 667. Conversely, a codeword with a smaller minimum distance may be scaled larger by gain element 667. Thus, the codeword is scaled by a factor related to the signal quality at which the codeword may be received.

The scaled codeword is then covered by a coverer 668 with a particular 8-ary Walsh function, $W_i^8$, provided by a Walsh cover generator 670. This Walsh function, $W_i^8$, is the one assigned to the selected access point having the best link to the access terminal. Each Walsh chip from coverer 668 is further covered by a coverer 672 with a 16-bit Walsh function, $W_8^{16}$ (i.e., a sequence of "1111111100000000") to generate the required number of chips. The sequence of (e.g., 2048) chips for the DRC message is then combined with other data within a combiner, and the combined data is provided to the next processing element (e.g., modulator 644). The processing of the message transmission from the access terminal may be achieved using an architecture similar to that shown in FIG. 6A. Depending on the particular scheme used for the message, the detection of the message may be performed within the demodulator (e.g., demodulator 624) or the receive data processor (e.g., processor 626). If the messages are associated with different points on a signal constellation, the demodulator can compare the received point versus the possible points in the signal constellation and declare the most likely transmitted message based on the comparison of the received and possible points. And if the messages are associated with different codewords (e.g., of different minimum distances or different lengths), the receive data processor can process the received codeword and declare the most likely transmitted message based on the comparison of the received and possible codewords.

For clarity, various aspects, embodiments, and features of the message transmission schemes of the invention have been specifically described for the DRC messages in the HDR system. The message transmission schemes described herein may be used for any set of defined messages to be transmitted on any channel on the forward or reverse link. The message transmission schemes of the invention may also be used for other wireless communication systems and for other CDMA systems that may support one or more other CDMA standards and/or designs.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. In a wireless communication system, a method for transmitting a message from a first entity to a second entity, comprising:
    determining, at the first entity, at least one characteristic of a communication link through which a signal is received from the second entity;
    forming the message indicative of a state of the communication link;
    assigning a codeword to the message, the assigned codeword being selected from an alphabet of a plurality of codewords, a minimum distance of the assigned codeword to its nearest codeword in the alphabet being associated with the state of the communication link; and
    transmitting the message from the first entity to the second entity at a particular power level determined based at least in part on the message, wherein the minimum distance of the codeword is based at least in part on how frequently the message is transmitted.

2. The method of claim 1, wherein the power level is determined based at least in part on the minimum distance of the codeword.

3. The method of claim 1, wherein the power level is determined based at least in part on an expected frequency of the codeword being transmitted.

4. The method of claim 1, wherein the power level is determined based at least in part on a particular number of times the codeword is repeated for a transmission.

5. The method of claim 1, wherein the message comprises a data rate control message indicative of a rate for a data transmission requested from the second entity.

6. The method of claim 1, wherein the at least one characteristic comprises a carrier-to-noise-plus interference ratio (C/I).

7. The method of claim 5, wherein the message is selected from a plurality of data rate control messages.

8. The method of claim 1, wherein the minimum distance of the codeword is based at least in part on a signal quality of the communication link.

9. In a wireless communication system, a method for transmitting a message from a first entity to a second entity, comprising:
    identifying a codeword associated with the message, wherein the identified codeword is one of a plurality of codewords defined for an alphabet, and wherein at least two codewords in the alphabet have unequal distances to their nearest codewords;
    determining a transmit power level for the identified codeword, based at least in part on a distance of the identified codeword to its nearest codeword in the alphabet; and
    transmitting the identified codeword from the first entity to the second entity at the determined transmit power level, wherein the message to be transmitted is one of a plurality of possible messages, wherein the plurality of codewords in the alphabet are assigned to the plurality of possible messages in accordance with a particular assignment scheme, and wherein the plurality of codewords in the alphabet are assigned to the plurality of possible messages such that messages to be transmitted at higher transmit power levels are assigned with codewords having larger distances to their nearest codewords.

10. The method of claim 9, wherein the transmit power level for the identified codeword is determined to achieve a particular level of performance.

11. The method of claim 10, wherein the particular level of performance is approximately one percent frame error rate or better.

12. In a wireless communication system, a method for transmitting a message from a first entity to a second entity, comprising:
    identifying a codeword associated with the message, wherein the identified codeword is one of a plurality of codewords defined for an alphabet, and wherein at least two codewords in the alphabet have unequal distances to their nearest codewords;
    determining a transmit power level for the identified codeword, based at least in part on a distance of the identified codeword to its nearest codeword in the alphabet; and
    transmitting the identified codeword from the first entity to the second entity at the determined transmit power level, wherein the message to be transmitted is one of a plurality of possible messages, wherein the plurality of codewords in the alphabet are assigned to the plurality of possible messages in accordance with a particular assignment scheme, and wherein the plurality of codewords in the alphabet are assigned to the plurality of possible messages such that messages to be transmitted frequently are assigned with codewords having larger distances to their nearest codewords.

13. The method of claim 9, wherein the alphabet includes N codewords having minimum distances of $d_1$ through $d_N$, and wherein the minimum distances conform to the following:

$$d_1 \geq d_2 \geq \ldots \geq d_{N-1} \geq d_N, \text{ and } d_1 > d_N.$$

14. The method of claim 9, wherein the message identifies a particular data rate for a data transmission requested by the first entity from the second entity.

15. The method of claim 9, wherein the first entity comprises an access terminal in the wireless communication system.

16. The method of claim 9, wherein the wireless communication system comprises a CDMA system.

17. The method of claim 9, wherein the plurality of codewords in the alphabet are associated with a plurality of points in a signal constellation, and wherein at least two points in the signal constellation have unequal distances to their nearest codewords.

18. The method of claim 17, wherein the plurality of points in the signal constellation are selected from points in signal constellations for quadrature phase shift keying (QPSK), M-ary phase shift keying (M-PSK), M-ary quadrature amplitude modulation (M-QAM), or a combination thereof.

19. An access terminal in a wireless communication system, comprising:
 a receiver configured to receive a signal from an access network and determine at least one characteristic of a communication link through which the signal is received;
 a data processor configured to form a message indicative of a state of the communication link and assign a codeword to the message, the codeword being selected from an alphabet of a plurality of codewords, a minimum distance of the codeword to its nearest codeword in the alphabet being associated with the state of the communication link; and
 a transmitter unit configured to transmit the message at a particular power level determined based at least in part on the message, wherein the minimum distance of the codeword is based at least in part on how frequently the message is transmitted.

20. An access terminal in a wireless communication system, comprising:
 a data processor configured to identify a codeword associated with a message, wherein the identified codeword is one of a plurality of codewords defined for an alphabet, and wherein at least two codewords in the alphabet have unequal distances to their nearest codewords, the data processor further configured to determine a transmit power level for the identified codeword, based at least in part on a distance of the identified codeword to its nearest codeword in the alphabet; and
 a transmitter unit operatively coupled to the data processor and configured to transmit the identified codeword at the determined transmit power level, wherein the plurality of codewords in the alphabet are assigned to the plurality of possible messages such that messages to be transmitted at higher transmit power levels are assigned with codewords having larger distances to their nearest codewords.

21. The access terminal of claim 20, further comprising:
 a signal quality measurement unit configured to receive samples for a received signal and to determine a received signal quality of signals transmitted from one or more transmitting sources, wherein the transmit power level is associated with the received signal quality of a transmitting source to which the identified codeword is transmitted.

22. A communication unit in a wireless communication system, comprising:
 a receiver configured to receive a signal from a transmitting source and determine at least one characteristic of a communication link through which the signal is received;
 a data processor configured to form a message indicative of a state of the communication link and assign a codeword to the message, the assigned codeword being selected from an alphabet of a plurality of codewords, a minimum distance of the assigned codeword to its nearest codeword in the alphabet being associated with the state of the communication link; and
 a transmitter unit configured to transmit the message at a particular power level determined based at least in part on the message, wherein the minimum distance of the codeword is based at least in part on how frequently the message is transmitted.

23. An apparatus in a wireless communication system, comprising:
 means for receiving a signal from a transmitting source and determining at least one characteristic of a communication link through which the signal is received;
 means for forming a message indicative of a state of the communication link;
 means for assigning a codeword to the message, the assigned codeword being selected from an alphabet of a plurality of codewords, a minimum distance of the assigned codeword to its nearest codeword in the alphabet being associated with the state of the communication link; and
 means for transmitting the message at a particular transmit power determined based at least in part on the message, wherein the minimum distance of the codeword is based at least in part on how frequently the message is transmitted.

24. The access terminal of claim 19, wherein the power level is determined based at least in part on the minimum distance of the codeword.

25. The access terminal of claim 19, wherein the at least one characteristic comprises a carrier-to-noise-plus interference ratio (C/I).

26. The access terminal of claim 19, wherein the message comprises a data rate control message indicative of a rate for a data transmission requested from the second entity.

27. The access terminal of claim 19, wherein the minimum distance of the codeword is based at least in part on a signal quality of the communication link.

28. The access terminal of claim 20, wherein the plurality of codewords in the alphabet are associated with a plurality of points in a signal constellation, and wherein at least two points in the signal constellation have unequal distances to their nearest codewords.

29. An apparatus in a wireless communication system, comprising:
 means for identifying a codeword associated with a message, wherein the identified codeword is one of a plurality of codewords defined for an alphabet, and wherein at least two codewords in the alphabet have unequal distances to their nearest codewords;
 means for determining a transmit power level for the identified codeword, based at least in part on a distance of the identified codeword to its nearest codeword in the alphabet; and
 means for transmitting the identified codeword at the determined transmit power levels wherein the plurality of codewords in the alphabet are assigned to the plurality of possible messages such that messages to be transmitted at higher transmit power levels are assigned with codewords having larger distances to their nearest codewords.

* * * * *